United States Patent [19]
Takahashi et al.

[11] Patent Number: 5,654,965
[45] Date of Patent: Aug. 5, 1997

[54] ATM COMMUNICATION NETWORK SYSTEM WITH COMMON SYSTEM INFORMATION STORAGE

[75] Inventors: Toshiyuki Takahashi, Hyogo; Tatsuki Ichihashi, Kanagawa; Kazuyuki Kashima, Kanagawa; Tetsuya Yokotani, Kanagawa; Keiichi Soda, Kanagawa, all of Japan

[73] Assignee: Mitsubishi Denki Kabushiki Kaisha, Tokyo, Japan

[21] Appl. No.: 543,759

[22] Filed: Oct. 16, 1995

[30] Foreign Application Priority Data

Jan. 25, 1995 [JP] Japan ................................ 7-009762
Apr. 20, 1995 [JP] Japan ................................ 7-095079
Jun. 5, 1995 [JP] Japan ................................ 7-137874

[51] Int. Cl.$^6$ ................................ H04L 12/56
[52] U.S. Cl. ................................ 370/390; 370/397
[58] Field of Search ................................ 370/60, 60.1, 94.2, 370/99, 94.1, 94.3, 85.6, 389, 390, 395, 397, 425, 432; 395/200.08

[56] References Cited

U.S. PATENT DOCUMENTS 5,303,233  4/1994  Sugawara ................................ 370/60
5,394,397  2/1995  Yanagi et al. ................................ 370/94.2
5,506,847  4/1996  Shobatake ................................ 370/94.3
5,533,020  7/1996  Byrn et al. ................................ 370/94.2

FOREIGN PATENT DOCUMENTS 5-316130  11/1993  Japan .
5-316131  11/1993  Japan .

Primary Examiner—Douglas W. Olms
Assistant Examiner—Chau T. Nguyen
Attorney, Agent, or Firm—Rothwell, Figg, Ernst & Kurz

[57] ABSTRACT

In an ATM communication network system comprising plural ATM terminals 1a to 1f respectively having individual real memories 38a to 38f to transmit and receive ATM cells and ATM switching apparatus 2a, 2c and 2e for switching the ATM cells transmitted and received among the ATM terminals 1a to 1f and setting a broadcast connection 4a designating the respective ATM terminals 1a to 1f as the transmitting ATM terminals, the virtual memory 3 may be realized on the real memories 38a to 38f of the ATM terminals 1a to 1f by periodically performing the broadcast cell communications using the broadcast connection 4a designating all the ATM terminals 1a to 1f in the present system as the transmitting apparatuses.

21 Claims, 8 Drawing Sheets

ATM COMMUNICATION NETWORK SYSTEM WITH COMMON SYSTEM INFORMATION STORAGE

BACKGROUND OF THE INVENTION

1. Field of the Invention

The present invention relates to an ATM communication system which constitutes an ATM (Asynchronous Transfer Mode) network system.

2. Description of the Related Art

In the conventional packet communication system, a packet has a comparatively longer length and is also variable, and transmission/exchange operations have been conducted based on software. Therefore, such packet communication system cannot realize a high speed and wide band communication exceeding 150 Mbps.

Meanwhile, a system for transferring information per unit of a packet (hereinafter referred to as a "cell") having a fixed length is called an ATM system, which can process speech, video and data signals in the same manner and perform the switching by hardware based on header information defined within the cells, to enable high speed and wide band transmission and switching of information with a large expectation for a future communication system.

However, such an ATM system has a problem that if it is attempted to store, for making reference, the information of all ATM terminals on the ATM communication network into only one ATM terminal by storing real memory information of the other ATM terminals on a real memory of an ATM terminal on the ATM communication network, it cannot be sure that all ATM terminals have in common the same information due to a delay of ATM cell transmission.

SUMMARY OF THE INVENTION

It is therefore an object of the present invention that all ATM terminals can have in common the same information within a short period of time, not depending on the network configuration of the ATM communication system.

In view of achieving the above-mentioned object, the ATM communication network system of the present invention is so constituted that a real memory of each ATM terminal of plural ATM terminals has a common system information storing the information of each ATM terminal among plural ATM terminals and a certain ATM terminal among plural ATM terminals updates, on demand, the data of the region to it of the common system information and transmits the data of the region to it in the predetermined period to the other ATM terminals on a broadcast connection preset for the certain ATM terminal, while the other ATM terminals write the data in the region to the certain ATM terminal of each common system information. That is, a virtual memory can be realized on the real memory of each ATM terminal by making the periodical broadcast cell on the broadcast connection where all ATM terminals in the preset system are provided as transmitting devices.

Moreover, in the ATM communication network system explained above, each ATM terminal among plural ATM terminals comprises an ATM cell transmitting unit which transmits, in the case of transmitting an update data to the common system information storing regions of the other ATM terminals, such update data by assigning contents of data to a service data unit of common part convergence sublayer in unit of 40 bytes, adding, moreover, a trailer of a protocol data unit of the 8-byte common part convergence sublayer, assigning further the data to a service data unit of ATM cell as the 48-byte common part convergence sublayer and by including address information of the common system information storing region into a virtual channel identifier of header information of the ATM cell, or virtual path identifier and virtual channel identifier, and into the trailer of the protocol data unit of the common part convergence sublayer, and an ATM cell receiving unit which recognizes, on receiving the ATM cells, the address Of common system information storing region from the virtual channel identifier of header information of the received ATM cell, or the virtual path identifier and virtual channel identifier, and the trailer of the protocol data unit of the common part convergence sublayer and writes the data in the service data unit of the received ATM cells into the common system information storing region on its own real memory. Therefore, increase of the processing time required for cell segmentation or cell reassembly of memory information can be prevented and moreover generation of burst of traffics can also be prevented. In addition, the range influenced by discard of cells can also be minimized.

In the above ATM communication network system, each ATM terminal among plural ATM terminals comprises, in the preceding stage of the ATM cell transmitting unit, a cell segmentation unit to segment, with a constant interval, the data in its own common system information storing region to it within the specified time in transmitting the update data of its own common system information storing regions to the other ATM terminals. With the structure explained above, generation of burst of traffics can further be prevented.

In the above ATM communication network system, a virtual path identifier is assigned to an ATM switching system for identifying it, a virtual channel identifier is assigned to each plural ATM terminals to identify it for an ATM switching apparatus to which they are connected, and each ATM terminal among plural ATM terminals uses, in transmitting the update data to the common system information storing region of the other ATM terminals, the virtual path identifier to identify the transmitting ATM switching apparatus and the virtual channel identifier to identify the transmitting ATM terminal and the address information where the update data are stored. With the structure explained above, it is no longer necessary to accommodate address information into the information field of CPCS-PDU, overheads for cell segmentation can be reduced and the network can be used efficiently by suppressing traffics in the network.

In the above ATM communication network system, a virtual channel identifier is assigned to each of ATM terminals to identify them and each of plural ATM terminals uses, in transmitting the data of its own region to the other ATM terminals, a virtual channel identifier to identify the transmitting ATM terminal as the address information where the update data are stored. In the structure explained above, it is also unnecessary to accommodate address information into the information field of CPCS-PDU, overheads for cell segmentation can be reduced and the network can be used efficiently by suppressing traffics in the network.

In the above ATM communication network system, each of plural ATM terminals provides, for each transmission of data of its own region, speed classes of ATM cell transmission including the data of its own region in order to execute the priority control for the ATM cell transmission so that the ATM cells can be transferred to the other ATM terminals within an allowable delay time of each speed class. Thus, it can be ensured that transmission of ATM cells can be completed within the delay time allowed for each speed class.

In the above ATM communication network system, an ATM switching system comprises a broadcast cell identifying means for identifying the ATM cells for the broadcast, an ATM cell discard means for discarding ATM cells when the identified ATM cells are those for the broadcast transmitted from itself, and a broadcast cell copying means for making as many copies of the identified ATM cells for broadcast other than those transmitted from itself as the output ports of the ATM switching system and transmitting those copies to the output ports. With this structure, generation of broadcast cells in the network can be minimized.

DETAILED DESCRIPTION OF THE PREFERRED EMBODIMENTS

Preferred embodiments of the present invention will be explained hereunder in detail with reference to the accompanying drawings.

Embodiment 1

Figure 1:
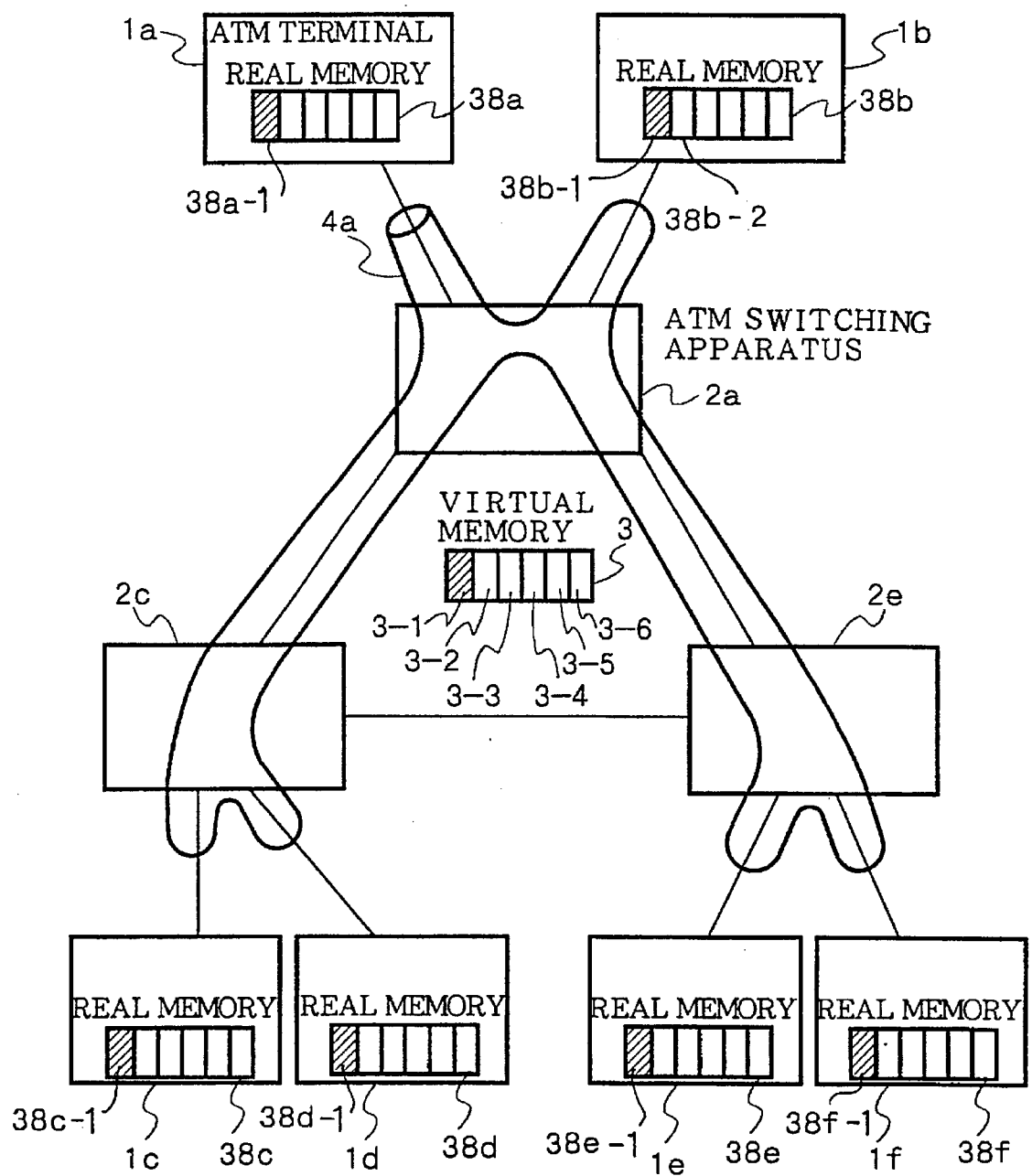
FIG. 1 is a block diagram illustrating the structure of an ATM communication network system in a preferred embodiment of the present invention.

FIG. 1 is a block diagram illustrating the structure of an ATM communication network system in a preferred embodiment of the present invention. In this figure, reference numerals 1a–1f (or reference numeral 1 when representing these elements) designate ATM terminals for transmitting or receiving ATM cells; 2a, 2c and 2e (or reference numeral 2 when representing these elements), an ATM switching system for relaying the ATM cells transmitted or received between the ATM terminals; and 3, a virtual memory of the ATM communication system including the regions 3-1 to 3-6 which are respectively used by the ATM terminals 1a to 1f. The region of the real memory 38a of the ATM terminal 1a, which is used respectively for data writing by the ATM terminal 1a is designated as 38a-1. In the same manner, the region of the real memory 38b of the ATM terminal 1b, which is used respectively for data writing by the ATM terminal 1b is designated as 38b-2. Reference numeral 4a designates a broadcast connection established in advance where the ATM terminal 1a is used as a transmitting source. Although not illustrated, the broadcast connection using each terminal of the other ATM terminals 1b–1f as the transmitting sources is also established.

In FIG. 1, when the ATM terminal 1a writes data into the write region 38a-1, the data written into the write region 38a-1 is then written into the respective regions 38b-1, 38c-1, 38d-1, 38e-1 and 38f-1 of the ATM terminals 1b, 1c, 1d, 1e and 1f, using the broadcast connection to each ATM terminal 1b–1f from the ATM terminal 1a. That is, the information of the ATM terminal 1a exists in its own local memory and the ATM terminal 1c, for example, can recognize the information of the ATM terminal 1a by reading the data in the region 38c-1. As explained above, the ATM terminals 1a–1f can recognize the information of the ATM terminals accommodated in the network as a whole by reading its own real local memory.

In reality, each ATM terminal stores the information of the other ATM terminals in its own real memory, i.e. local memory. However, it is considered in this technological field that the ATM communication system has a virtual memory 3 in which information all of the ATM terminals is virtually stored.

Embodiment 2

Figure 2:
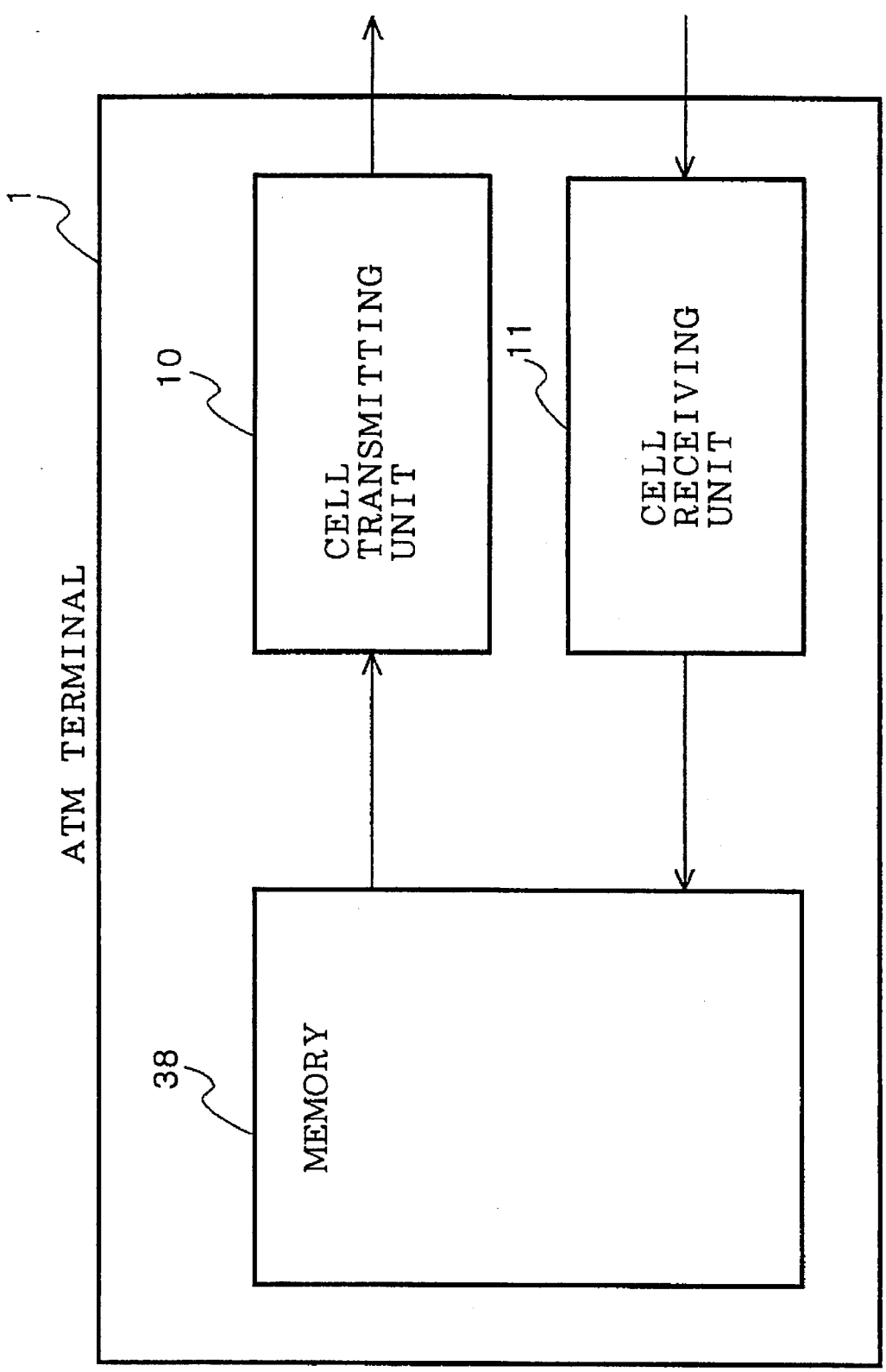
FIG. 2 is a block diagram illustrating the structure of an ATM terminal constituting the ATM communication network system shown in FIG. 1.
Figure 3:
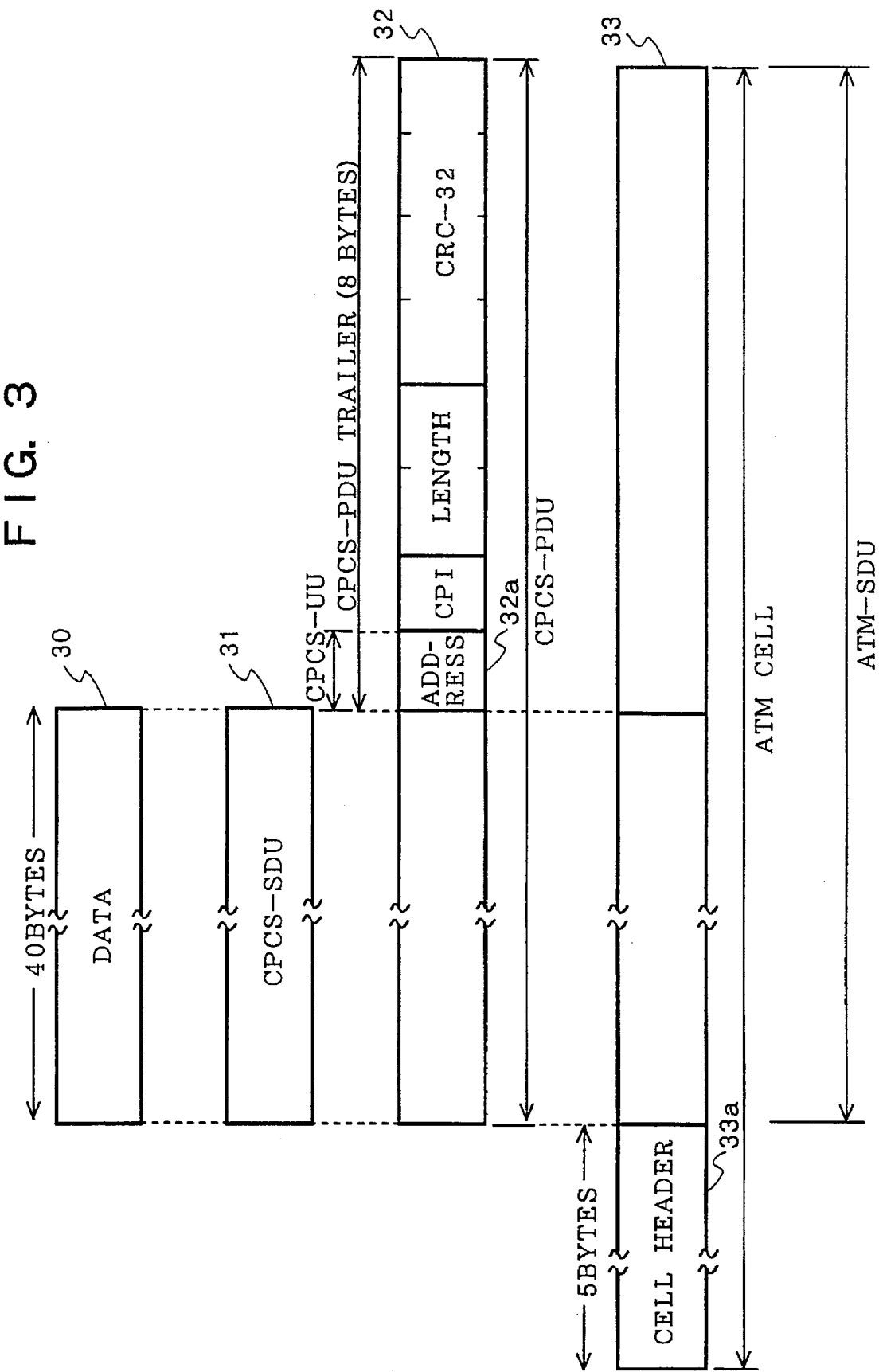
FIG. 3 is a diagram for explaining the process in which an ATM cell is formed into a predetermined format.

FIG. 2 is a block diagram of an ATM terminal forming the above-mentioned ATM communication network system in an ATM adaptation layer protocol (AAL type 5) mainly for data communication. In this figure, reference numeral 10 designates a cell transmitting unit; 11, a cell receiving unit; and 38, a real memory. FIG. 3 illustrates a format for explaining the process in which an ATM cell is formed. The top format 30 illustrates the profile of dividing the contents of data in units of 40 bytes. The second format 31 illustrates a profile of assigning the contents of the data divided in a unit of 40 bytes into a service data unit of common part convergence sublayer (hereinafter referred to as "CPCS-SDU"). The second format 32 from the bottom illustrates a profile of further adding a trailer of 8 bytes of the protocol data unit of the common part convergence sublayer (hereinafter referred to as "CPCS-PDU") to CPCS-SDU 31. The bottom format 33 illustrates a profile of assigning CPCS-PDU of 48 bytes to the service data unit of the ATM cell. Moreover, the address information on the virtual memory can be maintained in the address region 32a of the CPCS-PDU trailer and in the cell header 33a. The address information is put into CPCS-UU (CPCS User-User indication).

Regarding the signal transmitting process to the ATM switching apparatus 2 (2a) from the ATM terminal 1 (1a), the processing in the cell transmitting unit 10 will be explained with reference to FIG. 3. The cell transmitting unit 10 takes the first 40 bytes from the memory 38a-1 as shown in the format 30 and maps it on CPCS-SDU as shown in the format 31. Successively, the cell transmitting unit 10 puts the address information for identifying which 40-bytes on its own exclusive memory have been transmitted to the trailer of CPCS-PDU to form CPCS-PDU 32. CPCS-PDU 32 is mapped on ATM-SDU of the ATM cell 33 and the virtual path identifier and virtual channel identifier of the ATM cell header information are added to form a complete cell. Then, the cell is transmitted from the cell transmitting unit.

Processing in the cell receiving unit 11 will then be explained hereunder. The transmitting ATM terminal is identified from the virtual path identifier and virtual channel identifier of the received ATM cell header information to discriminate the memory regions corresponding to respective ATM terminals. When the virtual channel identifiers are uniquely assigned respectively to all ATM terminals, it is unnecessary to assign the virtual path identifier corresponding to the ATM switching apparatus. Next, the location in the memory of the ATM terminal where the data is to be stored is identified from the address information of the trailer of CPCS-PDU and the data of 40 bytes carried by CPCS-SDU is written into the appropriate position of the storing area on the memory.

As explained above, owing to the operations of the ATM terminals, it is not necessary to include the address information in the information field of CPCS-PDU cell, whereby the amount of data to be transmitted only with one ATM cell can be increased. Moreover, since one unit of data can be transmitted with one cell, increase of time required for cell segmentation and cell reassembly can be prevented and generation of burst of traffic can also be prevented.

In regard to data under 40 bytes and fractional data under 40 bytes generated by division of data, supplement is carried out until the data becomes 40 bytes in length and the effective length is written into the Length region of the CPCS-PDU trailer to form CPCS-PDU. In this case, the address information is added in the same manner as the 40 bytes data.

Embodiment 3

Figure 4:
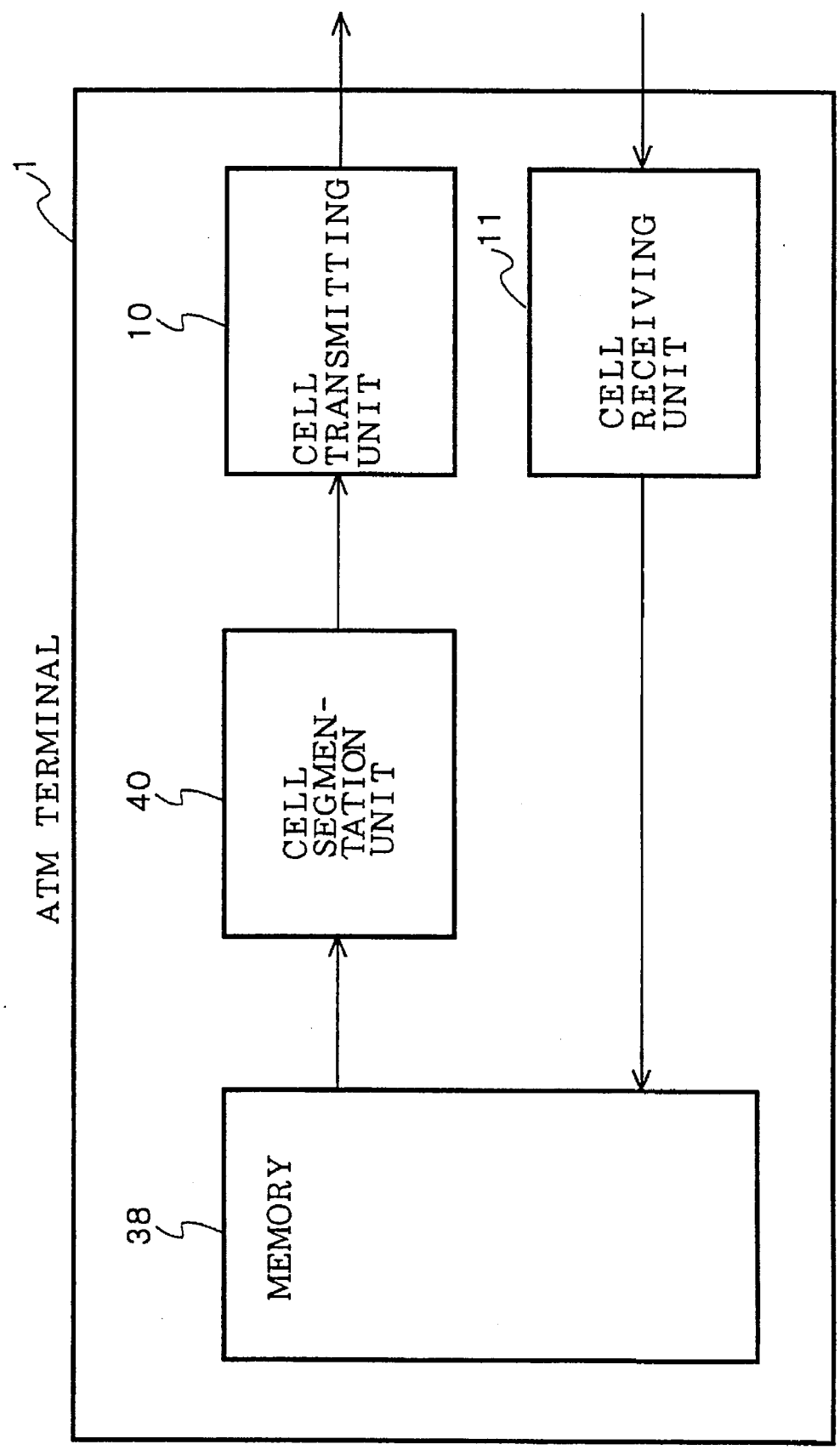
FIG. 4 is a block diagram illustrating the structure of other ATM terminals constituting the ATM communication network system shown in FIG. 1.

FIG. 4 is a block diagram illustrating the structure of other ATM terminals constituting the ATM communication network system, explained above. In FIG. 4, the cell segmentation unit 40 for segmenting the data in its own memory region into cells with a predetermined interval within a specified period is provided in the preceding stage of the cell transmitting unit 10 in view of providing a further effect of preventing burst of the traffic generated as explained in the embodiment 2.

Figure 5:
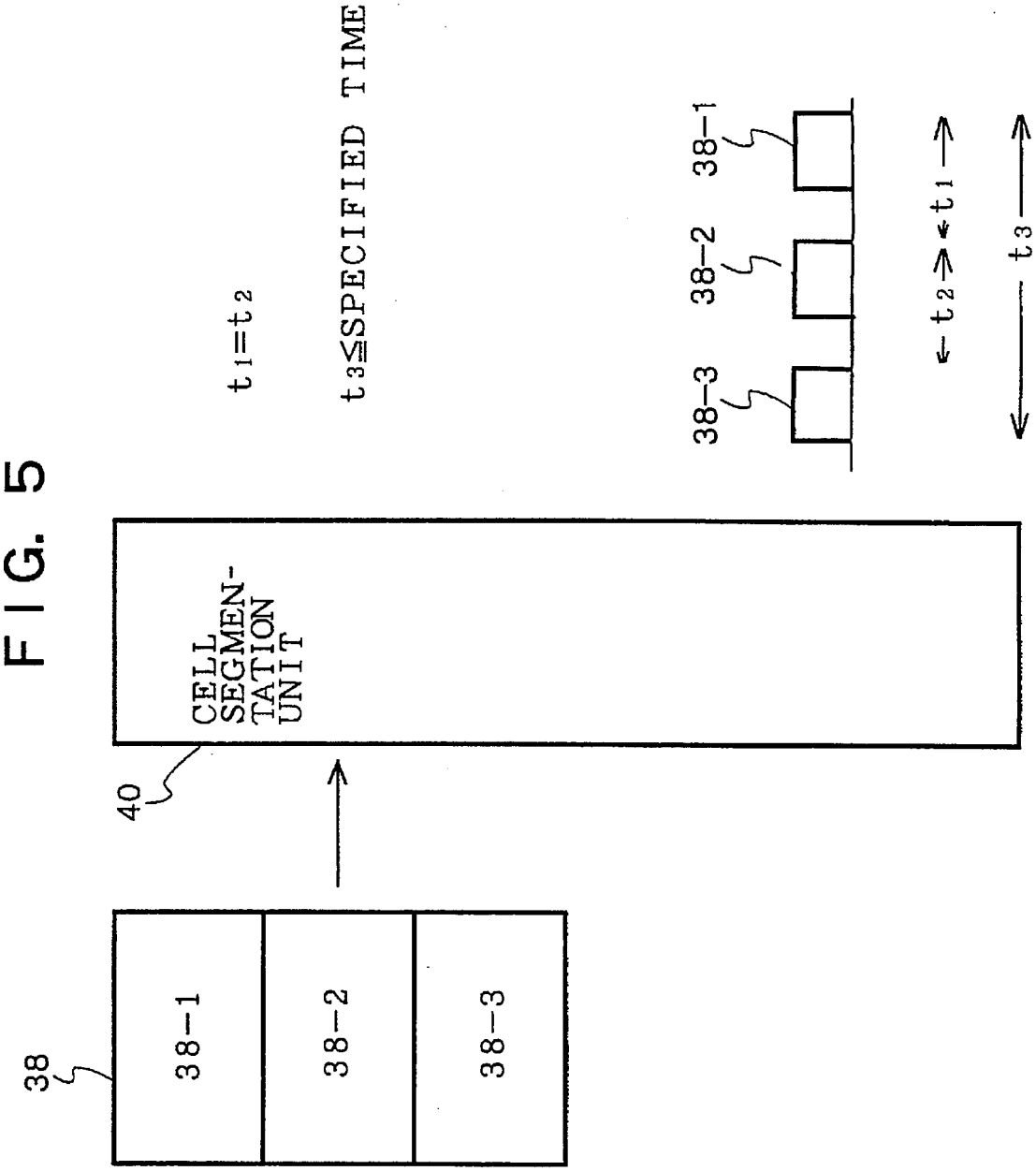
FIG. 5 is a diagram for explaining processing operations of a cell segmentation unit of an ATM terminal.

FIG. 5 is a diagram to explain the processing in the cell segmentation unit 40 based on an example of the transmission where the memory 38 is divided into three regions. The three pieces of information 38-1 to 38-3 of the memory 38 are once divided and then sent to the cell transmitting unit 10 with the constant interval (t1=t2) within the specified period (t3≦specified period).

The ATM cell can be formed or deformed in the same manner as Embodiment 2.

Embodiment 4

Figure 6:
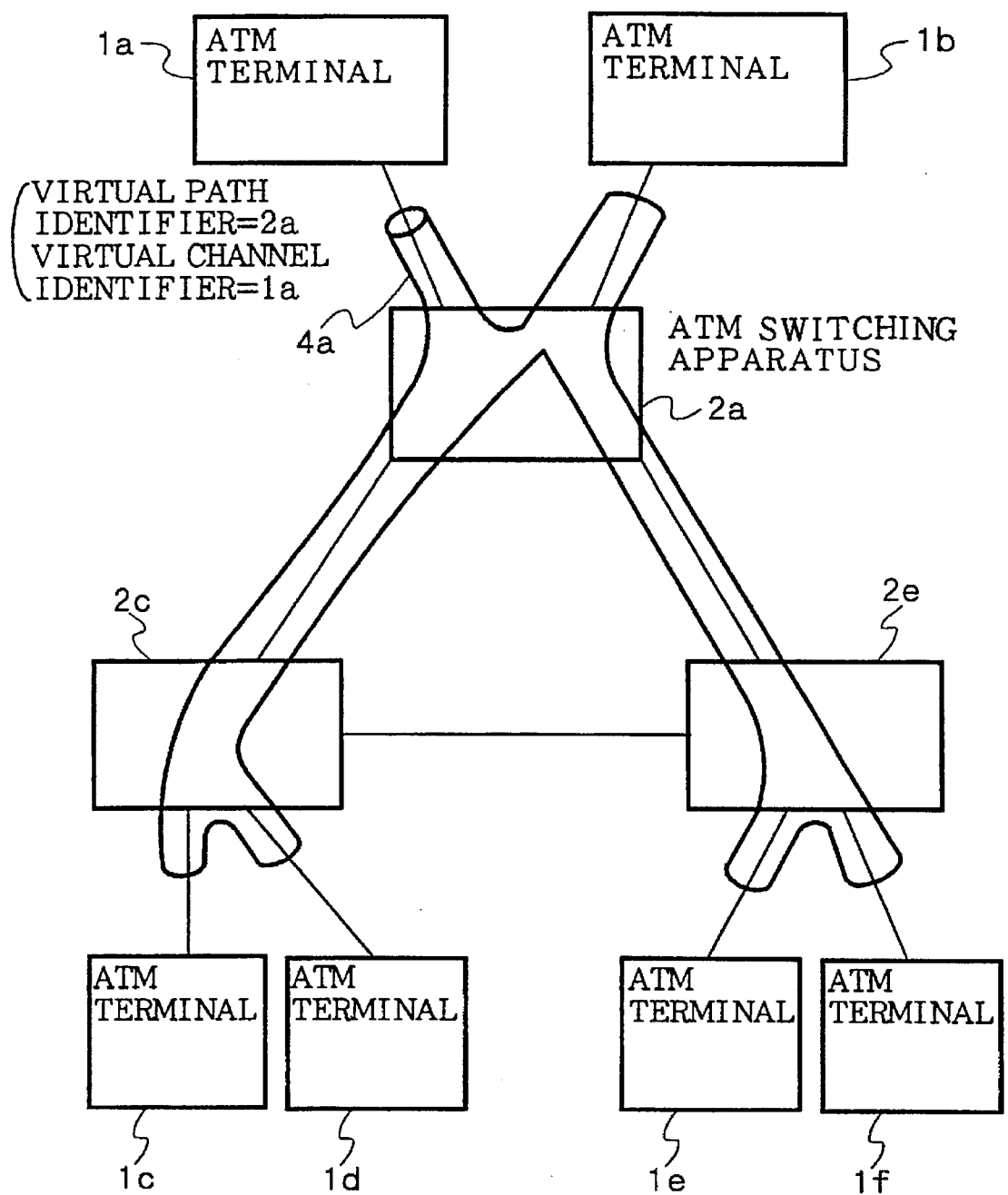
FIG. 6 is a diagram illustrating a profile of transferring address information of an ATM cell header using a virtual path identifier and a virtual channel identifier in the ATM communication network system.

FIG. 6 is a diagram illustrating the structure of the ATM communication network system, for explaining how the address information of an ATM cell header in Embodiment 2 is transferred by using a virtual path identifier and a virtual channel identifier. FIG. 6 also illustrates combination of the virtual path identifier and virtual channel identifier in the broadcast connection 4a. In the same figure, those indicated by reference numerals 1a to 1f, 2a, 2c and 2e have the same functions as those in FIG. 1. The virtual path identifier of the broadcast connection 4a is designated by 2a while the virtual channel identifier by 1a, and the ATM terminal which has received the data with this information recognizes the memory region to store the received data. The virtual path identifiers are precedingly reserved as many as the number of ATM switching apparatus. Meanwhile, the virtual channel identifiers are precedingly reserved as many as the ATM terminals which may be accommodated in one ATM switching apparatus. In this case, the virtual path identifier is set to the same number as the transmitting ATM switching apparatus, while the virtual channel identifier as the transmitting ATM terminal.

As explained above, owing to operations of the ATM terminals, it is not necessary to include address information into the information field of the ATM cell, whereby the amount of data to be transmitted with only one ATM cell can be increased.

Here, the virtual channel identifier may be uniquely assigned respectively to all ATM terminals. In this case, it is no longer necessary to assign the virtual path identifier to the ATM switching apparatus. In explanation with reference to FIG. 6, the broadcast connection 4a is identified only by the virtual channel identifier 1a and the ATM terminal which have received only such information recognizes the memory region for storing such information.

Embodiment 5

Figure 7:
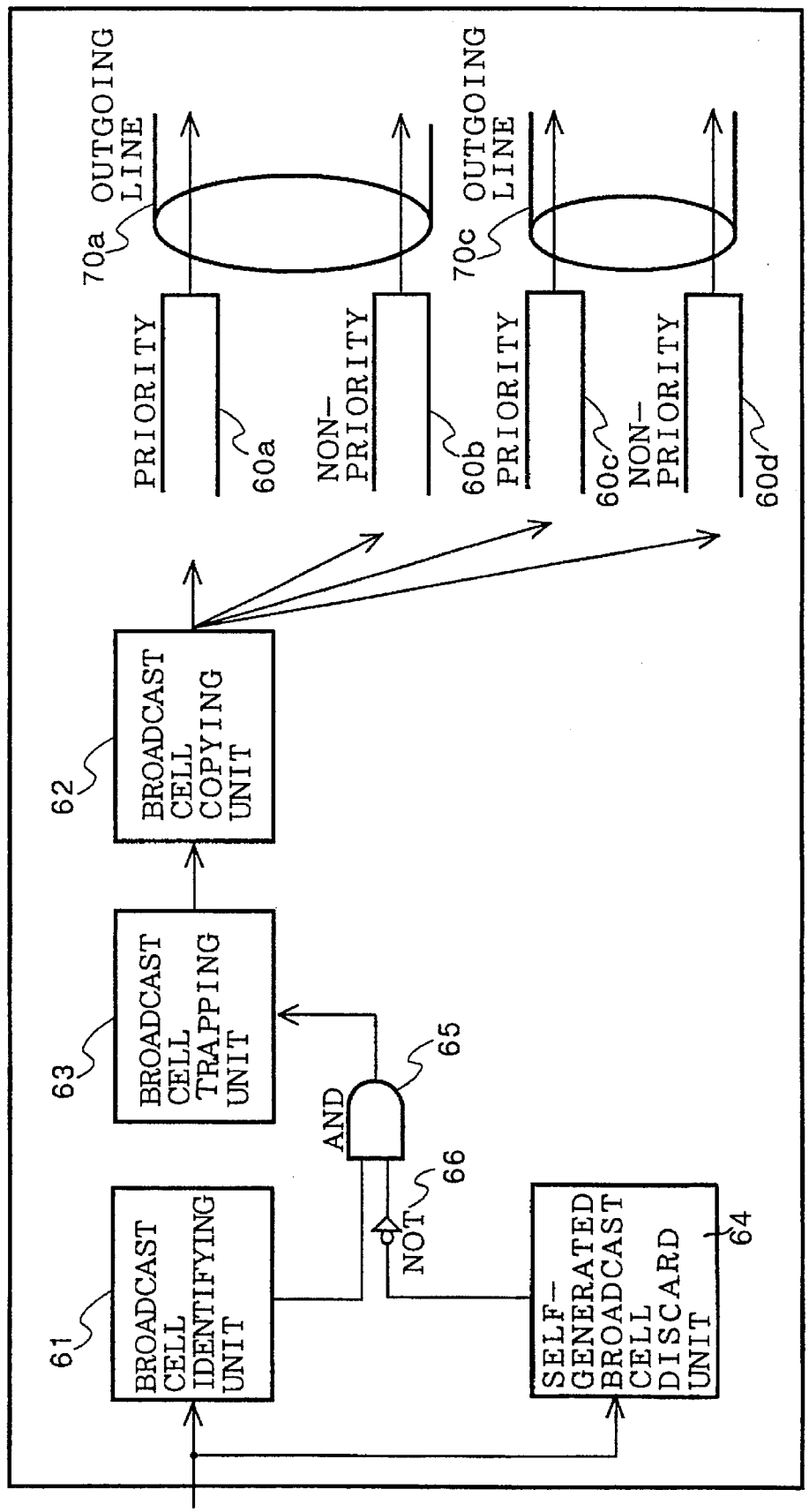
FIG. 7 is a block diagram illustrating the structure of an ATM switching system according to the present invention.

FIG. 7 is a functional block diagram illustrating an ATM switching apparatus used in the present invention. In this figure, reference numeral 60a–60d designate speed classes provided corresponding to the period for update to the same contents as the memory of the transmitting ATM terminal. In this example, two priority classes are provided, including priority classes of 60a and 60c and non-priority classes of 60b and 60d. Reference numeral 61 designates a broadcast identifying unit for identifying the broadcast cell; 62, a broadcast cell copying unit for copying and transmitting the data as many as the number of output ports; 63, a broadcast trapping unit for trapping broadcast cells when there are identified as those transmitted to its own ATM switching apparatus; and 64, a self-generated broadcast cell discard unit for discarding the broadcast cells when these are identified as those transmitted by own ATM switching apparatus provided in a ring type topology. When data are inputted to the broadcast cell identifying unit 61 and self-generated broadcast cell discard unit 64, the broadcast cell identifying unit 61 catches the broadcast cells and the self-generated broadcast cell discard unit 64 does not identify the cells as the self-Generated broadcast cells, an output from the broadcast cell identifying unit 61 passes through an AND circuit 65 and is then trapped by the broadcast cell trapping unit 63. Reference numeral 66 designates a NOT circuit; while 70a and 70c, outgoing lines.

Figure 8:
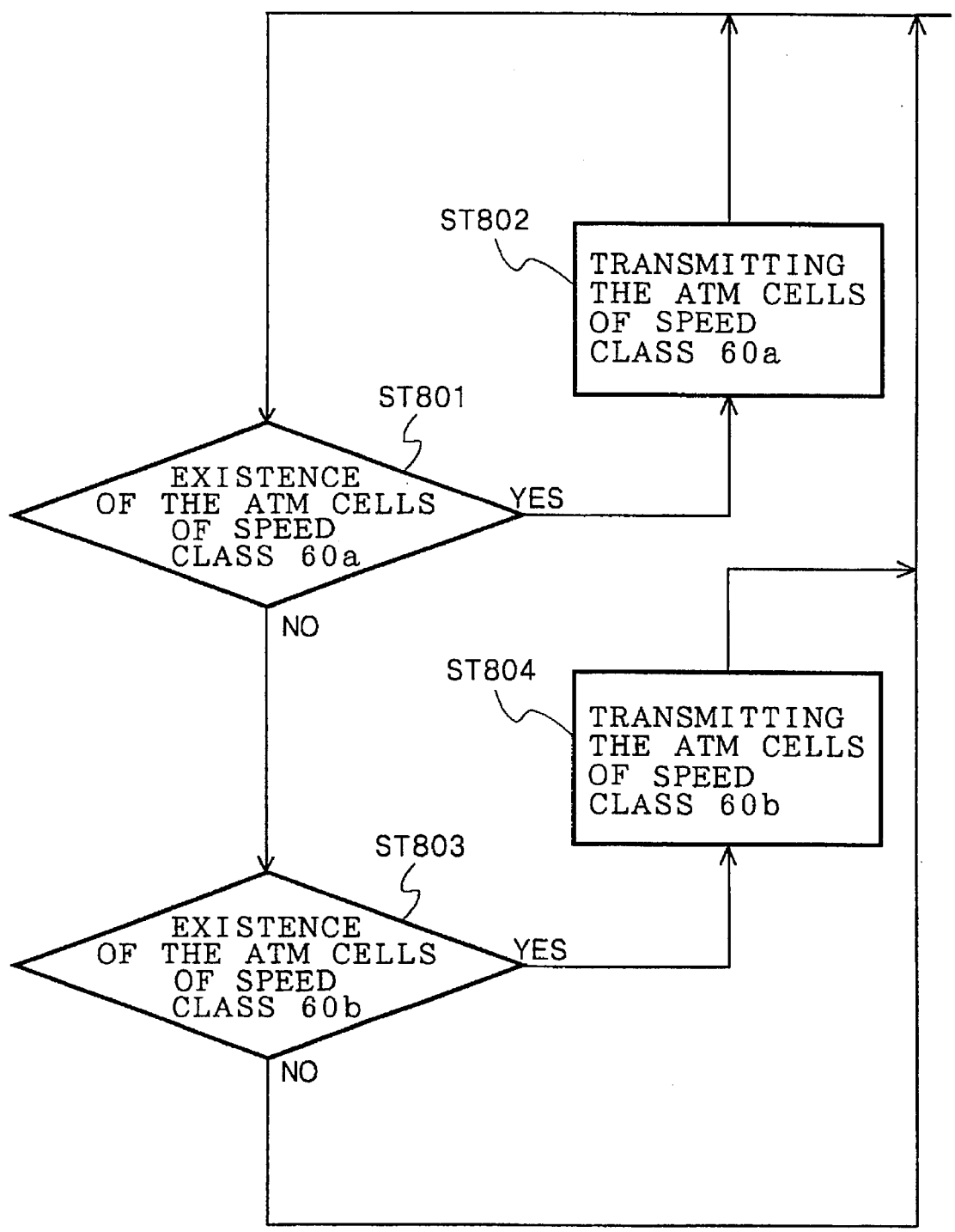
FIG. 8 is a flowchart illustrating the processing of speed classes of the ATM switching system according to the present invention.

FIG. 8 is a processing flowchart of the ATM cells of plural speed classes. The broadcast cell identifying unit 61 recognizes that the inputted cell is the broadcast cell to be transmitted to the ATM terminals accommodated in its own ATM switching apparatus by reading the address information in the ATM header of the input cell. Simultaneously, the self-generated broadcast cell discard unit 64 recognizes that the inputted cell is the broadcast cell transmitted previously to the network from its own ATM switching apparatus by reading the address information in the ATM cell header of the input cell. The outputted ATM cells are sometimes circulated in the ring type topology. Therefore, the broadcast cell trapping unit 63 traps the broadcast cells when the broadcast cell identifying unit 61 recognizes that the cell is a broadcast cell and the self-generated broadcast cell discard unit 64 recognizes that the broadcast cell is not transmitted previously to the network from its own ATM switching apparatus. Then, the trapped broadcast cell is transmitted to the broadcast cell copying unit 62.

Meanwhile, when the self-generated broadcast discard unit 64 recognizes that the inputted broadcast cell is a cell previously transmitted to the network by its own ATM switching apparatus, that cell is not trapped by the broadcast cell trapping unit 63 but is discarded. The broadcast cell copying unit 62 copies the broadcast cells, if these are ATM cells having the priority, and then transmits these broadcast cells to the two priority classes including, for example, the priority class 60a corresponding to the outgoing line 70a and the priority class 60c corresponding to the outgoing line 70c. On the other hand, in the case of the ATM cells having no priority (non-priority ATM cells), these broadcast cells are copied and transmitted to the two non-priority classes including the non-priority class 60b corresponding to the outgoing line 70a and the non-priority class 60d corresponding to the outgoing line 70c.

In the processing of each speed class, the cells of non-priority class are transmitted only when there is no cell corresponding to the priority class. Moreover, the cells are outputted to each outgoing line in parallel. The processing flowchart of each outgoing line will be explained with reference to FIG. 8 with an example of the outgoing line 70a. Existence of the ATM cells of the speed class 60a is checked (step ST801). When these cells exist, one ATM cell of the speed class 60a is processed (step ST802). Existence of the ATM cells of the speed class 60a is checked again (step ST801). Meanwhile, when the ATM cells of the speed class 60a do not exist (step ST801), existence of the ATM cells of the speed class 60b is checked (step ST803). When these cells exist, one ATM cell of the speed class 60b is processed (step ST804). Existence of the ATM cells of speed class 60a is checked again (step ST801). On the other hand, when the ATM cells of speed class 60b do not exist (step ST803), the processing step is returned to the step ST801 to check again the existence of the ATM cells of speed class 60a. The similar processing are performed for the speed classes 60c and 60d in parallel. Thereafter, the above-mentioned processing flows are repeated to transmit the ATM cells of the priority speed class on a priority basis from the outgoing line.

What is claimed is:

1. An ATM communication network system, comprising:
    a plurality of ATM terminals, each having an individual real memory to transmit or receive ATM cells;
    an ATM switching apparatus to relay the ATM cells transmitted from the ATM terminals; and
    means for establishing broadcast connections in which respective ATM terminals are designated as transmitting terminals;
    wherein the real memory of each of said plurality of ATM terminals has a common system information storing region for storing information of every ATM terminal on said communication network system, such that when one of said plural ATM terminals updates its own information in its own common system information storing region, said one ATM terminal transmits the updated data to other ones of said plurality of ATM terminals using the broadcast connection established for said one ATM terminal, and the other ATM terminals write the transmitted data into their common system information storing region.

2. The ATM communication network system according to claim 1, wherein each of said plurality of ATM terminals comprises:
    an ATM cell transmitting unit which transmits, in the case of transmitting an update data to the common system information storing region of the other ATM terminals, the update data by assigning the contents of data to a service data unit of a common part convergence sublayer in units of 40 bytes, by adding a trailer of a protocol data unit of an 8-byte common part convergence sublayer, further assigning the data to a service data unit of an ATM cell as a 48-byte common part convergence sublayer, and by including address information of the common system information storing region into a virtual channel identifier of header information of the ATM cell, or a virtual path identifier and a virtual channel identifier and the trailer of the protocol data unit of the common part convergence sublayer; and
    an ATM cell receiving unit which recognizes, in the case of receiving the ATM cells, the address of said common system information storing region from the virtual channel identifier of header information of the received ATM cell or the virtual path identifier and virtual channel identifier and the trailer of the protocol data unit of the common part convergence sublayer and writes the data in the service data unit of the received ATM cells into the common system information storing region of its own real memory.

3. The ATM communication network system according to claim 2, wherein each ATM terminal among said plural ATM terminals comprises, at a preceding stage of said ATM cell transmitting unit, a cell dividing means for dividing, within a specified period, the data in its own common system information storing region at a predetermined interval in the case of transmitting the update data of its own common system information storing region to the other ATM terminals.

4. The ATM communication network system according to claim 1, wherein a virtual path identifier is assigned to said ATM switching apparatus to identify this ATM switching apparatus, a virtual channel identifier is assigned to said plural ATM terminals to identify these ATM terminals for said ATM switching apparatus, and each ATM terminal of said plural ATM terminals uses, as the address information for storing the update data, a virtual path identifier for identifying the transmitting ATM switching apparatus and a virtual channel identifier for identifying the transmitting ATM terminal, in the case of transmitting the update data to the common system information storing regions of the other ATM terminals.

5. The ATM communication network system according to claim 2, wherein a virtual path identifier is assigned to said ATM switching apparatus to identify this ATM switching apparatus, a virtual channel identifier is assigned to said plural ATM terminals to identify these ATM terminals for said ATM switching apparatus, and each ATM terminal of said plural ATM terminals uses, as the address information for storing the update data, a virtual path identifier for identifying the transmitting ATM switching apparatus and a virtual channel identifier for identifying the transmitting ATM terminal, in the case of transmitting the update data to the common system information storing regions of the other ATM terminals.

6. The ATM communication network system according to claim 3, wherein a virtual path identifier is assigned to said ATM switching apparatus to identify this ATM switching apparatus, a virtual channel identifier is assigned to said plural ATM terminals to identify these ATM terminals for said ATM switching apparatus, and each ATM terminal of said plural ATM terminals uses, as the address information for storing the update data, a virtual path identifier for identifying the transmitting ATM switching apparatus and a virtual channel identifier for identifying the transmitting ATM terminal, in the case of transmitting the update data to the common system information storing regions of the other ATM terminals.

7. The ATM communication network system according to claim 1, wherein a virtual channel identifier is assigned to said plural ATM terminals for identifying these ATM terminals and each ATM terminal of said plural ATM terminals uses, in the case of transmitting the data of its own region to the other ATM terminals, a virtual channel identifier for identifying the transmitting ATM terminal as the address information for storing the update data.

8. The ATM communication network system according to claim 2, wherein a virtual channel identifier is assigned to said plural ATM terminals to identify these ATM terminals and each ATM terminal of said plural ATM terminals uses, in the case of transmitting the data of its own region to the other ATM terminals, a virtual channel identifier for identifying the transmitting ATM terminal as the address information for storing the update data.

9. The ATM communication network system according to claim 3, wherein a virtual channel identifier is assigned to said plural ATM terminals to identify these ATM terminals and each ATM terminal of said plural ATM terminals uses, in the case of transmitting the data of own region to the other ATM terminals, a virtual channel identifier for identifying the transmitting ATM terminal as the address information for storing the update data.

10. The ATM communication network system according to claim 4, wherein speed classes for transmission of the ATM cells including the data of its own region is provided in each ATM terminal of said plural ATM terminals and said each ATM terminal executes priority control over the transmission of the ATM cells for each transmission of the data of its own region so that said ATM cells are transmitted to the other ATM terminals within an allowable delay time defined for each speed class.

11. The ATM communication network system according to claim 5, wherein speed classes for transmission of the ATM cells including the data of its own region is provided in each ATM terminal of said plural ATM terminals and said each ATM terminal executes priority control over the transmission of the ATM cells for each transmission of the data of its own region so that said ATM cells are transmitted to the other ATM terminals within an allowable delay time defined for each speed class.

12. The ATM communication network system according to claim 6, wherein the speed classes for transmission of the ATM cells including the data of its own region is provided in each ATM terminal of said plural ATM terminals and said each ATM terminal executes priority control over the transmission of the ATM cells for each transmission of the data of its own region so that said ATM cells are transmitted to the other ATM terminals within an allowable delay time defined for each speed class.

13. The ATM communication network system according to claim 7, wherein speed classes for transmission of the ATM cells including the data of its own region is provided in each ATM terminal of said plural ATM terminals and said each ATM terminal executes priority control over the transmission of the ATM cells for each transmission of the data of its own region so that said ATM cells are transmitted to the other ATM terminals within an allowable delay time defined for each speed class.

14. The ATM communication network system according to claim 8, wherein speed classes for transmission of the ATM cells including the data of its own region is provided in each ATM terminal of said plural ATM terminals and said each ATM terminal executes priority control over the transmission of the ATM cells for each transmission of the data of its own region so that said ATM cells are transmitted to the other ATM terminals within an allowable delay time defined for each speed class.

15. The ATM communication network system according to claim 9, wherein speed classes for transmission of the ATM cells including the data of its own region is provided in each ATM terminal of said plural ATM terminals and said each ATM terminal executes priority control over the transmission of the ATM cells for each transmission of the data of its own region so that said ATM cells are transmitted to the other ATM terminals within an allowable delay time defined for each speed class.

16. The ATM communication network system according to claim 4, wherein said ATM switching apparatus comprises:

a broadcast cell identifying means for identifying broadcast ATM cells;

an ATM cell discard means for discarding ATM cells when the identified ATM cells are broadcast ATM cells transmitted from said ATM switching apparatus; and a broadcast cell copying means for copying, as many as the number of output ports of said ATM switching apparatus, the broadcast ATM cells other than those transmitted from said switching apparatus among the identified broadcast ATM cells and for transmitting the copied broadcast ATM cells to the output ports.

17. The ATM communication network system according to claim 5, wherein said ATM switching apparatus comprises:

a broadcast cell identifying means for identifying broadcast ATM cells;

an ATM cell discard means for discarding ATM cells when the identified ATM cells are broadcast ATM cells transmitted from said ATM switching apparatus; and a broadcast cell copying means for copying, as many as the number of output ports of said ATM switching apparatus, the broadcast ATM cells other than those transmitted from said switching apparatus among the identified broadcast ATM cells and for transmitting the copied broadcast ATM cells to the output ports.

18. The ATM communication network system according to claim 6, wherein said ATM switching apparatus comprises:

a broadcast cell identifying means for identifying broadcast ATM cells;

an ATM cell discard means for discarding ATM cells when the identified ATM cells are broadcast ATM cells transmitted from said ATM switching apparatus; and a broadcast cell copying means for copying, as many as the number of output ports of said ATM switching apparatus, the broadcast ATM cells other than those transmitted from said switching apparatus among the identified broadcast ATM cells and for transmitting the copied broadcast ATM cells to the output ports.

19. The ATM communication network system according to claim 7, wherein said ATM switching apparatus comprises:

a broadcast cell identifying means for identifying broadcast ATM cells;

an ATM cell discard means for discarding ATM cells when the identified ATM cells are broadcast ATM cells transmitted from said ATM switching apparatus; and a broadcast cell copying means for copying, as many as the number of output ports of said ATM switching apparatus, the broadcast ATM cells other than those transmitted from said switching apparatus among the identified broadcast ATM cells and for transmitting the copied broadcast ATM cells to the output ports.

20. The ATM communication network system according to claim 8, wherein said ATM switching apparatus comprises:

a broadcast cell identifying means for identifying broadcast ATM cells;

an ATM cell discard means for discarding ATM cells when the identified ATM cells are broadcast ATM cells transmitted from said ATM switching apparatus; and a broadcast cell copying means for copying, as many as the number of output ports of said ATM switching apparatus, the broadcast ATM cells other than those transmitted from said switching apparatus among the identified broadcast ATM cells and for transmitting the copied broadcast ATM cells to the output ports.

21. The ATM communication network system according to claim 9, wherein said ATM switching apparatus comprises:

a broadcast cell identifying means for identifying broadcast ATM cells;

an ATM cell discard means for discarding ATM cells when the identified ATM cells are broadcast ATM cells transmitted from said ATM switching apparatus; and a broadcast cell copying means for copying, as many as the number of output ports of said ATM switching apparatus, the broadcast ATM cells other than those transmitted from said switching apparatus among the identified broadcast ATM cells and for transmitting the copied broadcast ATM cells to the output ports.

* * * * *

UNITED STATES PATENT AND TRADEMARK OFFICE
CERTIFICATE OF CORRECTION

PATENT NO. : 5,654,965
DATED : August 5, 1997
INVENTOR(S) : Toshiyuki Takahashi et al.

It is certified that error appears in the above-indentified patent and that said Letters Patent is hereby corrected as shown below:

In the Abstract: Lines 2, 6-7, 10, and 12, "if" in each instance should be -- 1f --;
Col. 2, line 8, "Of" should be -- of --; Col. 6, line 35, "self-Generated" should be -- self-generated --.

Signed and Sealed this

Twenty-eighth Day of April, 1998

Attest:

BRUCE LEHMAN

Attesting Officer

Commissioner of Patents and Trademarks